(12) United States Patent
Klotz et al.

(10) Patent No.: US 7,992,912 B2
(45) Date of Patent: Aug. 9, 2011

(54) LOADING BASE FOR MOTOR VEHICLES

(75) Inventors: Wolfgang Klotz, Coburg (DE); Oliver Jacob, Wittgendorf (DE)

(73) Assignee: Brose Fahrzeugteile GmbH & Co. KG. Coburg, Coburg (DE)

( * ) Notice: Subject to any disclaimer, the term of this patent is extended or adjusted under 35 U.S.C. 154(b) by 171 days.

(21) Appl. No.: 12/234,469

(22) Filed: Sep. 19, 2008

(65) Prior Publication Data

US 2009/0074547 A1   Mar. 19, 2009

(30) Foreign Application Priority Data

Sep. 19, 2007   (DE) .......................... 10 2007 044 910

(51) Int. Cl.
*B60R 9/00*   (2006.01)
(52) U.S. Cl. ..................................... 296/26.09; 296/37.1
(58) Field of Classification Search .................. 296/36.1, 296/36.16, 26.01, 37.1, 36.12, 26.09, 26.13; 414/392, 545, 463, 464, 465, 466
See application file for complete search history.

(56) References Cited

U.S. PATENT DOCUMENTS

| | | | | | |
|---|---|---|---|---|---|
| 2,014,019 | A | * | 9/1935 | Girl | 414/462 |
| 2,091,071 | A | * | 8/1937 | Girl | 414/466 |
| 2,094,401 | A | * | 9/1937 | Girl | 414/462 |
| 2,547,083 | A | * | 4/1951 | Lundgren | 414/463 |
| 2,778,517 | A | * | 1/1957 | Weinstein et al. | 414/462 |
| 2,795,363 | A | * | 6/1957 | Turner | 224/526 |
| 2,953,287 | A | * | 9/1960 | Werner | 224/496 |
| 3,132,755 | A | * | 5/1964 | Greenslate | 414/522 |
| 3,365,084 | A | * | 1/1968 | Fernicola | 414/462 |
| 3,627,158 | A | * | 12/1971 | Kobasic | 414/462 |
| 3,915,492 | A | * | 10/1975 | Agnese | 296/172 |
| 4,455,948 | A | * | 6/1984 | Torres | 108/44 |
| 4,753,567 | A | * | 6/1988 | Achee, Sr. | 414/462 |
| 4,799,849 | A | * | 1/1989 | Miller | 414/462 |
| 4,969,793 | A | * | 11/1990 | Pawl | 414/462 |
| 5,544,998 | A | * | 8/1996 | Malinowski | 414/522 |
| 5,765,987 | A | * | 6/1998 | Zimmermann | 414/800 |
| 6,039,421 | A | * | 3/2000 | Fulterer | 312/333 |
| 6,266,931 | B1 | * | 7/2001 | Erickson et al. | 52/67 |
| 6,338,523 | B1 | * | 1/2002 | Rasmussen | 296/175 |
| 6,533,525 | B2 | | 3/2003 | Haid et al. | |

(Continued)

FOREIGN PATENT DOCUMENTS

DE   10029669 A1 * 1/2001

(Continued)

*Primary Examiner* — Glenn Dayoan
*Assistant Examiner* — Pinel E Romain
(74) *Attorney, Agent, or Firm* — Christie, Parker & Hale, LLP

(57) ABSTRACT

A loading base for load spaces in motor vehicles includes two loading base segments arranged one behind the other in the direction of the vehicle longitudinal axis. A first loading base segment adjacent to the back seats is connected to a rail system, which may be pivoted about a pivot axis aligned in the direction of the transverse axis of the motor vehicle with a lifting device arranged in the region of a rear loading edge, and adjusts the first loading base segment in the direction of the vehicle longitudinal axis in a translatory manner, so that irrespective of the height of the loading edge easy loading and unloading of loads is possible. The rail system and the lifting device are configured in the manner of a longitudinal seat adjustment device and seat height adjustment device of a motor vehicle seat.

17 Claims, 11 Drawing Sheets

U.S. PATENT DOCUMENTS

| | | | |
|---|---|---|---|
| 6,619,714 B2 * | 9/2003 | Schneider et al. | 296/26.13 |
| 6,709,038 B2 * | 3/2004 | Bienert et al. | 296/26.1 |
| 6,779,824 B1 * | 8/2004 | Lazarevich et al. | 296/50 |
| 6,805,391 B2 * | 10/2004 | Schneider | 296/26.01 |
| 6,840,568 B2 * | 1/2005 | Carrillo et al. | 296/163 |
| 6,851,734 B2 * | 2/2005 | Findley | 296/26.13 |
| 6,871,897 B1 * | 3/2005 | Snyder | 296/26.13 |
| 6,896,307 B2 * | 5/2005 | Nye et al. | 296/26.01 |
| 7,188,881 B1 | 3/2007 | Sturt et al. | |
| 7,234,747 B2 * | 6/2007 | Rasmussen | 296/26.01 |
| 7,393,036 B2 * | 7/2008 | Bastian et al. | 296/26.09 |
| 7,543,872 B1 * | 6/2009 | Burns et al. | 296/26.09 |
| 7,543,873 B1 * | 6/2009 | Thornsberry | 296/26.09 |
| 7,607,365 B1 * | 10/2009 | Courser | 74/89.11 |
| 7,681,936 B2 * | 3/2010 | McClintock et al. | 296/37.14 |
| 7,712,812 B2 * | 5/2010 | Gagliano | 296/26.09 |
| 2002/0034430 A1 * | 3/2002 | Sotiroff et al. | 414/462 |
| 2002/0043811 A1 * | 4/2002 | Sotiroff et al. | 296/24.1 |
| 2002/0074831 A1 * | 6/2002 | Sotiroff et al. | 296/216.04 |
| 2005/0194510 A1 * | 9/2005 | Krebs et al. | 248/422 |
| 2005/0285422 A1 * | 12/2005 | Bartos et al. | 296/26.09 |
| 2006/0197351 A1 * | 9/2006 | Bastian et al. | 296/26.09 |
| 2006/0255611 A1 * | 11/2006 | Smith et al. | 296/37.16 |
| 2006/0290157 A1 * | 12/2006 | Bohlke et al. | 296/37.6 |

FOREIGN PATENT DOCUMENTS

| | | |
|---|---|---|
| DE | 100 06 617 C1 | 7/2001 |
| DE | 601 10 162 T2 | 3/2006 |
| DE | 10 2004 051 622 A1 | 4/2006 |
| DE | 10 2005 031 072 A1 | 1/2007 |
| DE | 10 2005 039 810 A1 | 3/2007 |
| DE | 10 2006 009 886 A1 | 9/2007 |
| EP | 1 145 908 B1 | 10/2001 |
| EP | 1 852 308 A1 | 11/2007 |

* cited by examiner

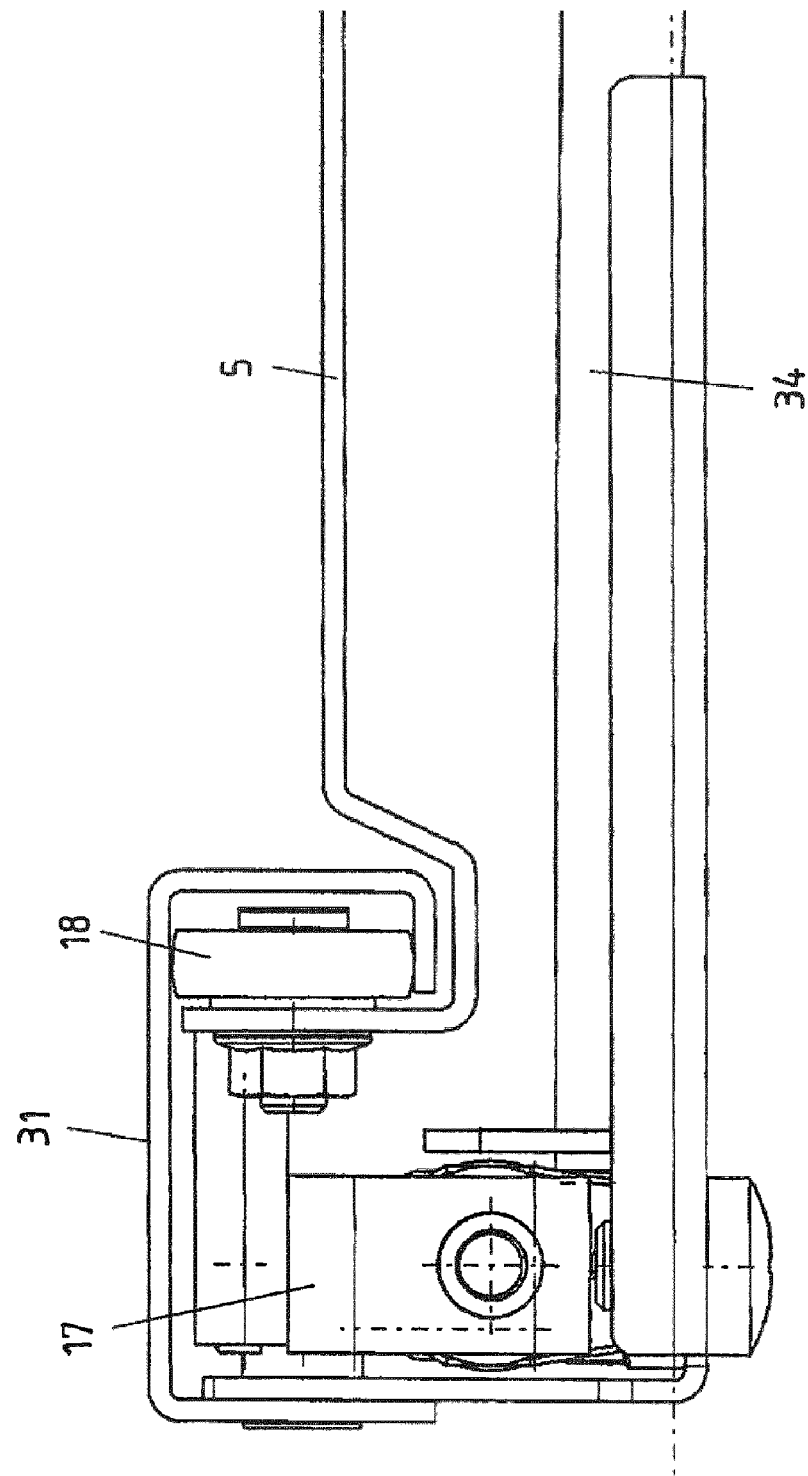

LOADING BASE FOR MOTOR VEHICLES

CROSS-REFERENCE TO A RELATED APPLICATION

This application claims priority to and the benefit of German application No. 10 2007 044 910.2, filed on Sep. 19, 2007, the entire content of which is hereby incorporated by reference.

BACKGROUND

The invention relates to a loading base for motor vehicles.

With the corresponding depth of the load space, in particular in coupés or notchback sedan vehicles, the depositing of loads in, and the removal of loads from, a region of a rear load space adjacent to the back or rear seats of a motor vehicle is difficult, due to the distance from the rear of the motor vehicle and is associated with the risk of soiling, in particular where there is a raised loading edge. In order to facilitate loading and unloading, it is known to provide a loading base as a loading aid which may be adjusted in the direction of the longitudinal axis or X-axis of a motor vehicle.

A load space configured as a vehicle trunk of a motor vehicle is known from DE 601 10 162 T2, which is closed by a trunk lid and contains a device for bearing loads, which comprises a movable plate and a fixed plate of a bearing surface of the vehicle trunk. The movable plate is arranged on a set of rails and connected to a motorized operating mechanism, by means of which the movable plate is adjusted from a first operating position in which it is aligned with an edge of the fixed plate, into a second operating position in which it is positioned over the fixed plate, so that a loaded object located on the movable plate is moved in the direction of a person standing behind the vehicle. In this connection, it is possible to arrange a lower plate completely covering the loading base and an upper partial plate arranged displaceably on said lower plate, which is displaceable on the lower plate in the direction of the longitudinal axis of the motor vehicle. In a further embodiment, two upper partial plates are provided, of which a rear plate adjacent to the back seats may be raised by means of two handles and may be pushed over the upper plate adjacent to the rear of the vehicle.

A loading base for the load space of a motor vehicle is known from EP 1 145 908 B1 with a plate covering the loading base, which is arranged on an upper frame, which is displaceably mounted relative to a lower frame. Both frames are able to be raised and lowered together in the vertical direction in the undisplaced position. In the raised position, the upper frame is displaceable relative to the lower frame in the horizontal direction for retracting and extending the upper frame. For raising and lowering the two frames and for displacing the upper frame relative to the lower frame, electromotive drive devices are provided, the lower frame being able to be raised and lowered by means of lifting devices supported in a fixed manner on the vehicle and the upper frame being able to be displaced relative to the lower frame via a pushing device which has a feed screw mounted on the lower frame.

SUMMARY

It is the object of the present invention to provide an adjustable loading base of the aforementioned type, which is of simple and functionally reliable construction and, irrespective of the height of a rear loading edge of the load space, allows easy loading and unloading of loads, in particular into the region adjacent to the back or rear seats of a motor vehicle.

An exemplary solution according to an exemplary embodiment of the invention provides an adjustable loading base of the aforementioned type, which is of simple and functionally reliable construction and, irrespective of the height of a rear loading edge of the load space, allows easy loading and unloading of loads, in particular at the region adjacent to the back or rear seats of a motor vehicle, so that it is not necessary to displace heavy and bulky loads in the load space of the motor vehicle and every region of the load space is within easy reach.

The exemplary solution according to the invention provides a flat loading base in the transport state, which has a low height and thus optimally utilizes the available load space. As a result of the pivotable arrangement about a pivot axis of the first loading base segment adjacent to the back seats, the first loading base segment may either be adjusted as far as a loading edge or even beyond the loading edge and thus be adapted to any loading edge height.

For adjusting the first loading base segment from a transport position, in which the first loading base segment is adjacent to the back seats of the motor vehicle, into a loading and unloading position in which the first loading base segment is positioned with its rear edge facing the rear of the motor vehicle on the loading edge or over the loading edge, the first loading base segment is connected to a rail system by means of which the first loading base segment may be adjusted in the longitudinal direction and the one end thereof having the pivot axis and the other end thereof being height-adjustable by means of a lifting device arranged in the region of the loading edge.

The connection of the first loading base segment to a rail system articulated, on the one hand, to the pivot axis and, on the other hand, connected to a lifting device allows a very simple construction for a divided, adjustable loading base which in the transport position forms a flat base, and for loading and unloading by simple means allows the adjustment of the first loading base segment over the loading base segments located to the rear thereof in the direction of travel.

In one example, the rail system is configured in the manner of a longitudinal seat adjustment device of a motor vehicle seat.

The design of the adjusting device for adjusting the first loading base segment from the transport position into the loading and unloading position and, in reverse, in the manner of a longitudinal seat adjustment device of a motor vehicle seat allows the use of a simple, reliable and tried and tested adjusting device and thus use of cheaply available functional elements proven with regard to their reliability. In addition to the use of functional elements which are also used in a longitudinal seat adjustment device, corresponding control and regulating electronics may also be used, in particular with regard to collision protection by means of which a risk of trapping is also eliminated.

The rail system comprises guide rails aligned, in particular, parallel to the side edges of the first loading base segment and thus in the direction of the X-axis of the motor vehicle and connected to the pivot axis as well as to the lifting device, which guide rails comprise a C-profile with slots oriented toward the side edges of the first loading base segment, in which adjusting elements connected to the first loading base segment are guided.

The adjusting elements exemplary consist of slides with rollers guided in the guide rails, which are driven by an electrical, hydraulic or pneumatic drive device. In a preferred embodiment, the drive device is connected to a spindle adjusting device which drives spindles connected to the guide rails, on which spindle nuts connected to the first loading base segment are arranged.

The guide rails are configured as trim rails for aesthetic/design reasons as well as for covering the drive mechanism for the longitudinal and height adjustment of the rail system.

For the additional securing of loads, the guide rails arranged on both sides of the loading base comprise securing eyes or the like for fastening and/or passing through securing ropes.

As a result of dividing the adjustment of the first loading base segment into a pivoting motion and a translatory adjustment, provision is made to configure the lifting device in the manner of a seat height adjustment device of a motor vehicle seat which may be adjusted by means of an electrical, hydraulic or pneumatic drive device.

In this exemplary embodiment of the lifting device, in addition to having recourse to proven functional elements which may be mass-produced and thus cost effectively produced, it is also possible to have recourse to corresponding control and regulating electronics which ensure effective protection against trapping when lowering the first loading base segment.

The drive device of the lifting device is preferably connected to a spindle adjusting device and drives a spindle nut which meshes with a spindle articulated to a flange, so that the flange fixedly connected to a shaft rotates the shaft in one or the other direction depending on the rotational direction of the drive device and pivots a lever fixedly connected to the shaft and articulated to a spindle receiver for the spindles of the longitudinal adjustment device for adjusting the height of the rail system and thus the first loading base.

A control device provided for the longitudinal adjustment of the rail system and the height adjustment of the lifting device activates the drive motors of the rail system and the lifting device and is connected on the operator side to an operating switch arranged in the load space and/or may be actuated via a remote control, and contains a collision protection control for preventing body parts or objects from being trapped.

Exemplary, the dividing line extends between the two loading base segments in the direction of the vehicle transverse axis or Y-axis, so that when displacing the first loading base segment into the loading and unloading position, a flat loading edge of the first loading base segment aligned with the rear of the motor vehicle is ensured.

In principle, the part of the loading base pivotable about the rotational axis may consist of a plurality of loading base segments which may be adjusted relative to one another in a telescopic manner. Similarly, a loading base segment or a plurality of loading base segments may be arranged in the direction of travel behind one or more adjustable loading base segments. Thus, for example, behind a first loading base segment which may be adjusted and pivoted in a translatory manner, two rear loading base segments divided in the longitudinal direction, i.e. in the direction of the X-axis, may be provided of which at least one is foldable and allows access to a spare tire or the like arranged below the floor of the load space on the bodywork side.

In an exemplary embodiment, however, two loading base segments are provided arranged one behind the other in the direction of the X-axis of the motor vehicle, of which the first loading base segment adjacent to the back seats of the motor vehicle may be raised by pivoting about the pivot axis and may be adjusted over the second loading base segment located to the rear thereof in the direction of travel at least as far as a loading edge defining the loading base to the rear of the motor vehicle or beyond a loading edge defining the loading base to the rear of the motor vehicle, whilst the second loading base segment is arranged on or parallel to the floor of the load space on the bodywork side and is foldably connected to the floor on the bodywork side about an axis and preferably covers a recess of the floor on the bodywork side which serves to receive on-board tools or a spare tire and/or serves as a dirt trap.

As the second loading base segment adjacent to the rear of the motor vehicle remains in the plane of the floor of the load space on the bodywork side, it is additionally ensured that, when loading and unloading, loads which drop down do not pass under the second loading base segment and are not damaged during lowering.

In a further exemplary embodiment, a load limit stop is provided on the front edge of the first loading base segment adjacent to the back seats, which firstly forms a barrier as collision protection for the backrest of the back seats for high, bulky objects, so that a sufficient distance is maintained from the backrests of the back seats even at a considerable angle, and secondly serves as crash protection and in the event of a crash ensures that the loads located on the loading base do not result in endangering passengers located on the back seats.

Additionally, the load limit stop may secure loads placed on the first loading base segment during translatory adjustment of the first loading base segment in the inclined position from the loading and unloading position into the transport position and vice versa.

In order to allow through-loading of loads without obstruction, when the backrests of the back seats are folded down and/or when the back seats are folded down, the load limit stop is configured to be foldable, the pivot axis of the load limit stop being arranged at the end of the rail system adjacent to the back seats. In a first position, the load limit stop projects from the surface of the first loading base segment, whilst it is aligned in a second position parallel to the surface plane of the first loading base segment and thus allows easy displacement of loads on a flat surface.

In order to avoid soiling of clothing on the rear of the motor vehicle, in particular on the fender of the motor vehicle, during loading and unloading, the rear edge of the first loading base segment adjacent to the second loading base segment is connected to a protective mat which drops over parts of the rear of the motor vehicle, in particular over the rear fender of the motor vehicle in the loading and unloading position of the first loading base segment.

BRIEF DESCRIPTION OF THE DRAWINGS

The idea underlying the invention is to be described in more detail with reference to an embodiment shown in the figures, in which:

FIG. 7C shows a cross section through a guide rail and the first loading base segment the side edges of which are connected to the slide and rollers.

DETAILED DESCRIPTION

Figure 1:
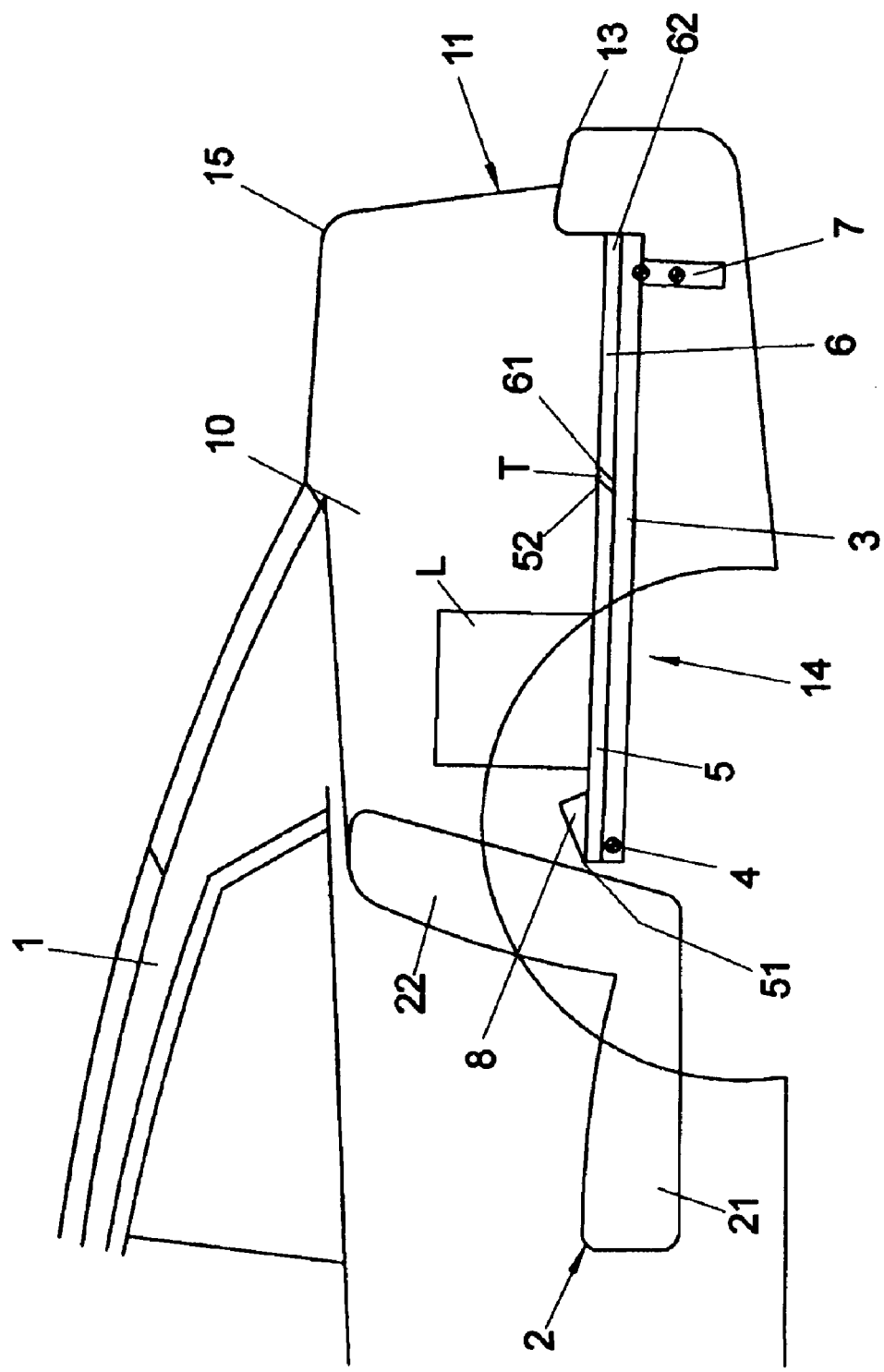
FIG. 1 shows a schematic longitudinal section through the rear of a motor vehicle with a divided loading base in a base position or transport position.

The schematic longitudinal section shown in FIG. 1 through the rear region of a motor vehicle with a motor vehicle body 1 and a back or rear seat 2 with a seat lower frame 21 with a seat cushion and a backrest 22 shows a load space 10 which is accessible via a load space door or tailgate 15 from the rear 11 of the motor vehicle. The rear limit of the load space 10 is formed by a loading edge 13 which, according to the design of the motor vehicle bodywork, is aligned in one plane with the floor 14 of the load space 10 on the bodywork side or—as in the embodiment shown—projects above the floor 14 on the bodywork side.

In particular in a motor vehicle configured as a notched sedan vehicle or coupé, the load space 10 projects into a region below the motor vehicle bodywork receiving the rear window as far as the rear face of the back seats 2, so that loads L to be arranged in this region may be reached only with difficulty by a person positioned at the rear 11, in an ergonomically unfavorable, hunched stance and with the risk of soiling on the rear 11 of the motor vehicle.

According to the invention, the loading base 5, 6 arranged above the floor 14 on the bodywork side is divided in the direction of the vehicle longitudinal axis or X-axis by a dividing line T extending preferably in the direction of the vehicle transverse axis or Y-axis, into a first loading base segment 5 adjacent to the back seats 2 and a second loading base segment 6 adjacent to the rear 11 of the motor vehicle, so that loads L arranged in the region of the load space 10 which is not easily accessible, may be arranged on the first loading base segment 5 adjacent to the back seats 2.

The first loading base segment 5 is connected on its front edge 51 facing the back seats 2 to a foldable load limit stop 8, which prevents a collision with the rear edge of the backrest 22 of the back seats 2 and—as is explained in more detail hereinafter with reference to FIG. 2—prevents inadvertent displacement of the loads L when adjusting the first loading base segment 5 from the loading and unloading position shown schematically in FIG. 2 into the base position or transport position shown in FIG. 1.

The front edge 61 of the second loading base segment 6 is adjacent to the rear edge 52 of the first loading base segment 5, the rear edge 62 thereof terminating flush with the loading edge 13.

In the base position or transport position shown in FIG. 1 of the divided loading base 5, 6, the two loading base segments 5, 6 form a flat loading base surface which permits a displacement of loads L, as required.

The first loading base segment 5 is connected to a rail system 3 which is pivotable about a pivot axis 4 aligned in the direction of the vehicle transverse axis or Y-axis and adjacent to the rear face of the back seats 2, by means of a lifting device 7 arranged in the region of the rear 11, which is articulated to the rail system 3 and connected to the floor of the bodywork 1.

Figure 2:
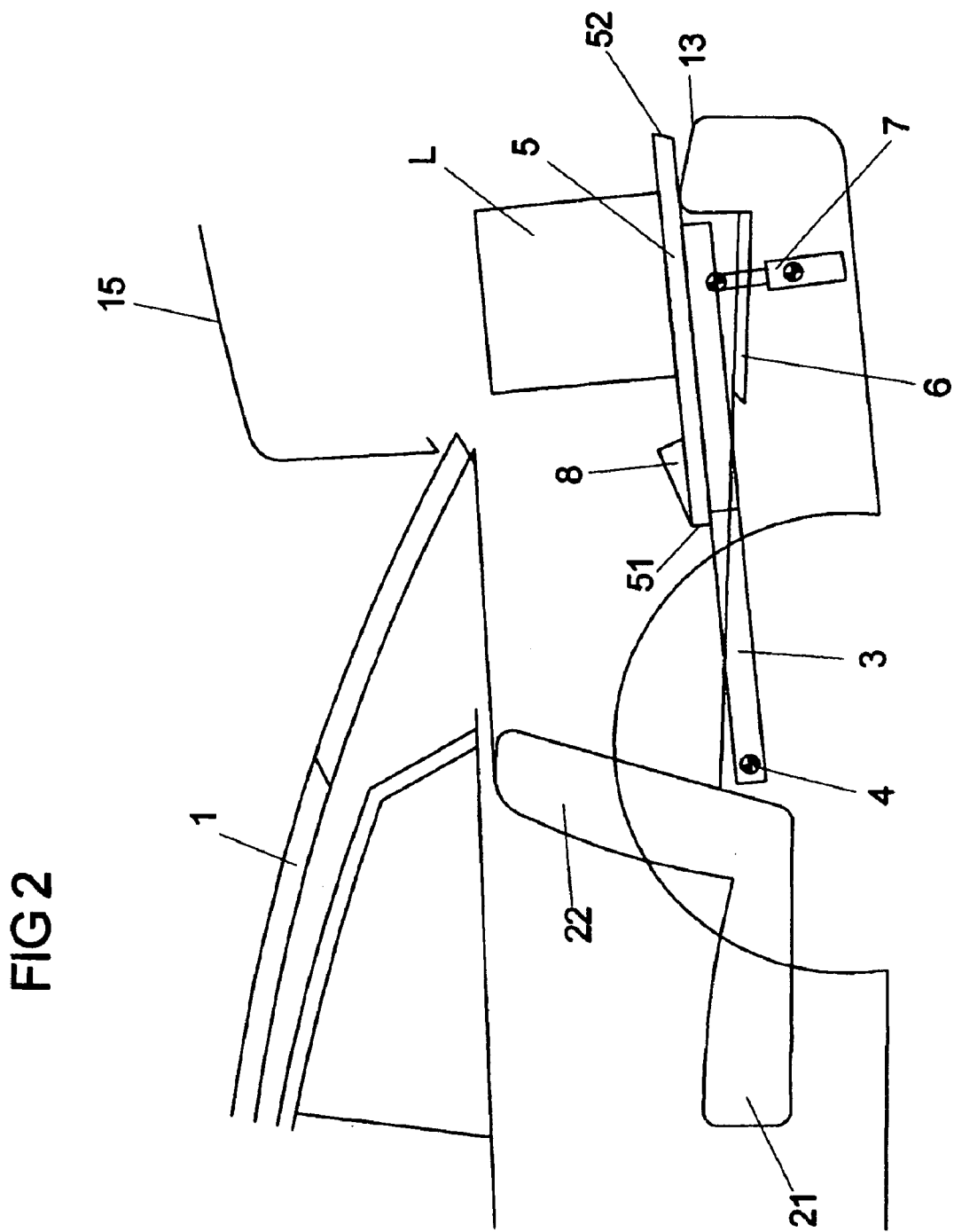
FIG. 2 shows a schematic longitudinal section through the rear of a motor vehicle with a divided loading base in a loading and unloading position.

FIG. 2 shows in a section through the rear region of the motor vehicle the divided loading base 5, 6 in the loading and unloading position, in which the rail system 3 has been pivoted about the pivot axis 4 by means of the lifting device 7 and moved in a translatory manner with the load space door or trunk lid 15 folded up in the longitudinal direction toward the rear 11, so that the loads L are positioned in a region which is accessible in an easy and ergonomically advantageous manner for the user. The first loading base segment 5 projects in this embodiment of the solution according to the invention beyond the loading edge 13, so that particularly easy access to the loads L is ensured. During the longitudinal displacement of the first loading base segment 5, in particular with a high loading edge 13 and a correspondingly large pivot angle of the rail system 3 about the rotational axis 4 the load limit stop 8 serves to secure the position of the loads L.

As may be seen from the schematic view according to FIG. 2, the second loading base segment 6 remains in its position in which it bears on the floor 14 on the bodywork side or is aligned parallel thereto. By the connection of the front edge 61 or a side edge of the second loading base segment 6 to a hinge fastened to the floor 14 on the bodywork side, to the bodywork or to the rail system 3, the second loading base segment 6 may be folded up and allows access to a recess of the floor 14 on the bodywork side, which serves to receive on-board tools or a spare tire and/or serves as a dirt trap.

For loading the load space 10, in the loading and unloading position of the first loading base segment 5, shown in FIG. 2, loads L may be placed on the first loading base segment 5 and by means of an adjusting device described hereinafter are moved in the longitudinal direction by actuating the rail system 3, until the part of the rail system 3 which may be adjusted in a translatory manner reaches the end position, in which the load limit stop 8 ensures collision protection with the rear face of the backrest 22 of the back seats 2. Subsequently, the lifting device 7 is lowered, so that the base position or transport position of the divided loading base 5, 6 shown schematically in FIG. 1 is reached, in which the first loading base segment 5 terminates at the dividing line T flush with the second loading base segment 6, and by bearing on the floor 14 on the bodywork side or aligned parallel thereto and to the second loading base segment 6, creates a flat loading surface.

Preferably, the rear edge 52 of the first loading base segment 5 and the front edge 61 of the second loading base segment 6 are beveled, so that the first loading base segment 5 bears in the end position of the transport position positively on the second loading base segment 6.

Figure 3:
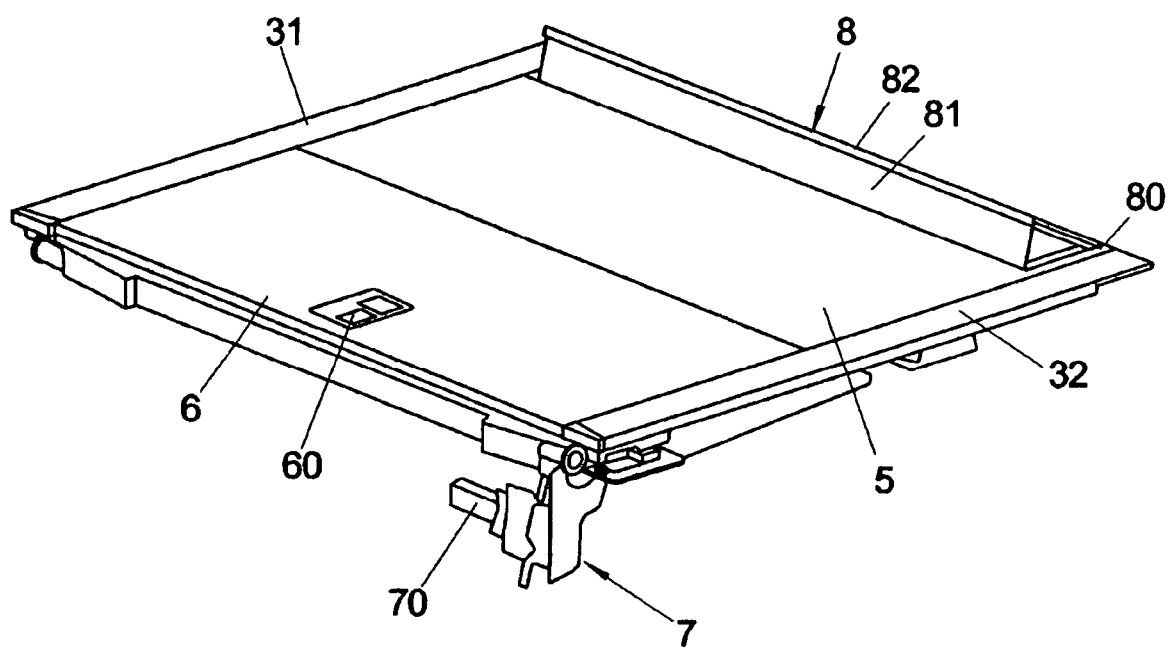
FIG. 3 shows an isometric view of the divided loading base in the base position or transport position.

FIG. 3 shows in an isometric view the divided loading base 5, 6 in the base position or transport position of the first loading base segment 5, in which it terminates flush with the second loading base segment 6, and forms a continuous, flat loading base surface. In this base position or transport position the foldable load limit stop 8 is folded up, so that a front load limit stop surface 81 faces loads positioned on the loading base 5, 6, whilst the rear load limit stop surface 82 faces the rear face of the back seats 2 arranged in front. For through-loading of elongated loads, such as ladders or skis, the load limit stop 8 is foldable about an axis 80 connected to the ends of the rail system 5, and may be folded into a position in which the rear surface 82 forms an extension of the loading base surface formed by the loading base segments 5, 6.

Figure 9:
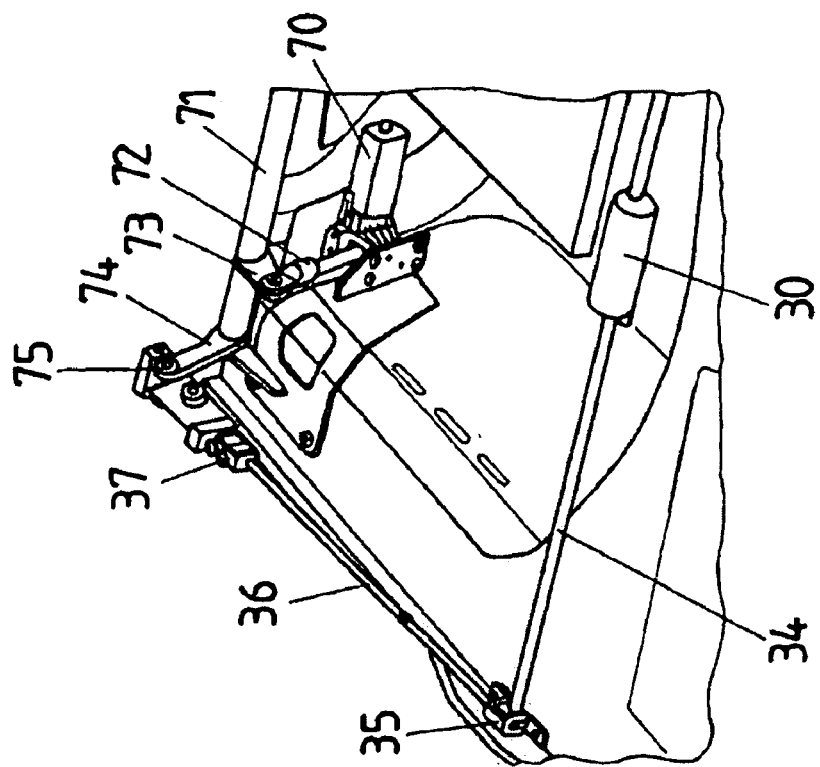
FIG. 9 shows an isometric view of the drive devices for the height adjustment device and longitudinal adjustment device of the first loading base segment.
Figure 8:
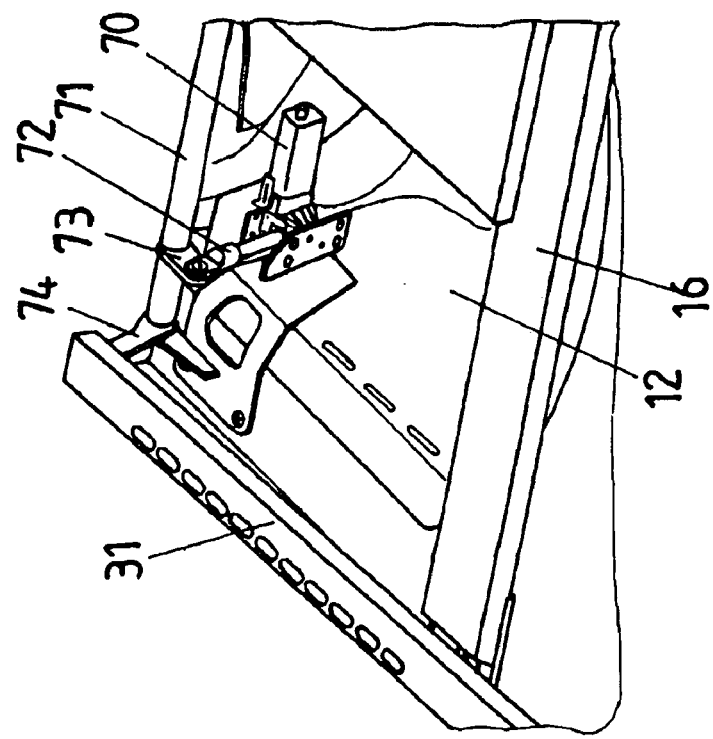
FIG. 8 shows an isometric view of the drive devices for the height adjustment device and longitudinal adjustment device of the first loading base segment.

From the view according to FIG. 3, it is also possible to see the lateral guide rails 31, 32 as part of the rail system 3 for adjusting the first loading base segment 5, the rear ends thereof being connected to the lifting device 7, which consists of a spindle drive with an electric motor 70 shown in FIGS. 8 and 9.

Figure 6:
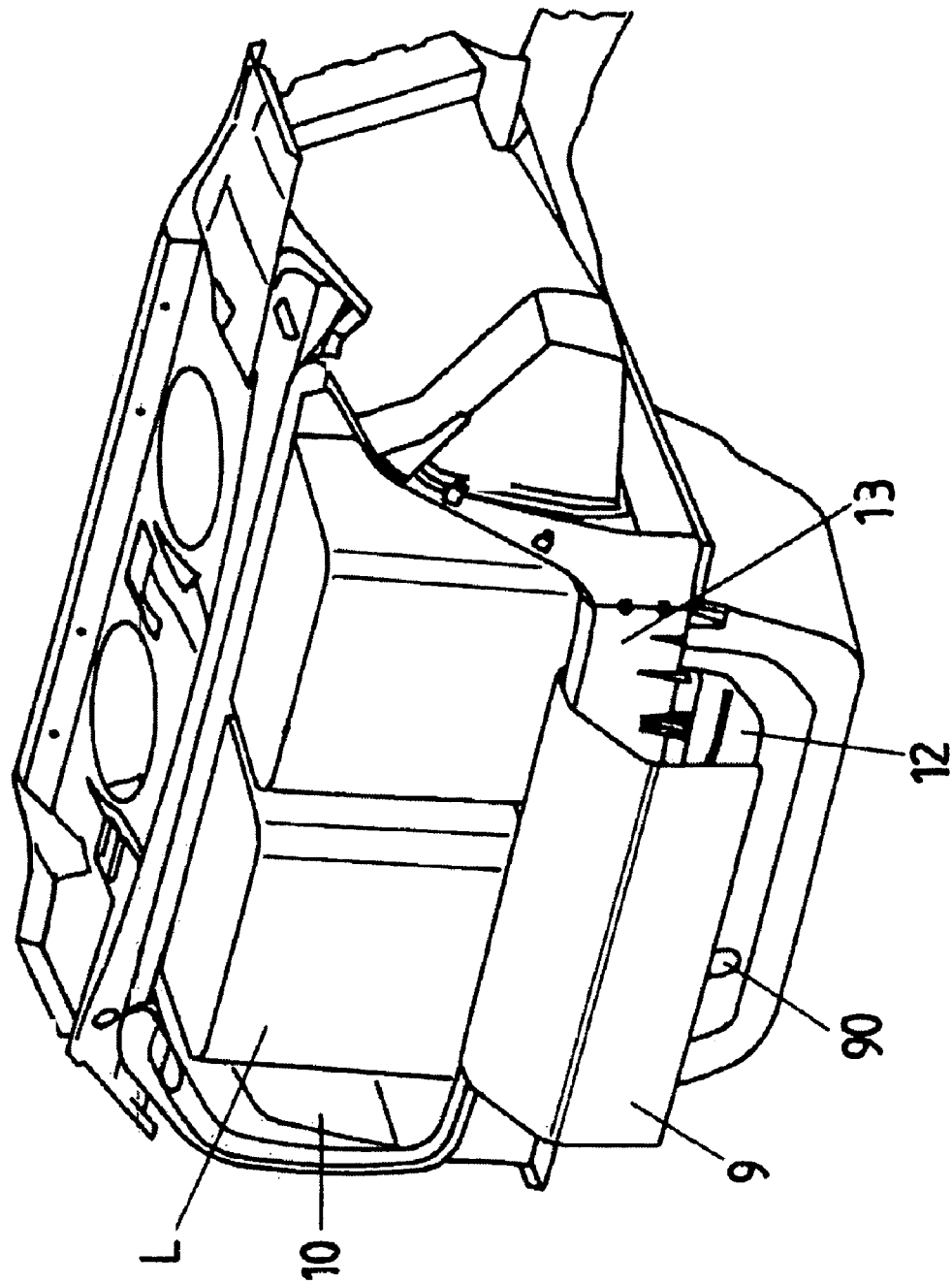
FIG. 6 shows an isometric view of the rear region of the motor vehicle with a protective mat pulled out.

The second loading base segment 6 bearing both in the base position or transport position and in the loading and unloading position of the first loading base segment 5 on the floor 14 of the load space 10 on the bodywork side or aligned parallel thereto, comprises a recessed handle 60, in which a user may grip and the second loading base segment 6 may be folded about an axis extending at the dividing line T between the first loading base segment 5 and the second loading base segment 6, in the base position or transport position of the first loading base segment 5, so that a recess region 12 (FIG. 6) of the floor 14 of the load space 10 on the bodywork side located under the second loading base segment 6 is accessible.

Figure 4:
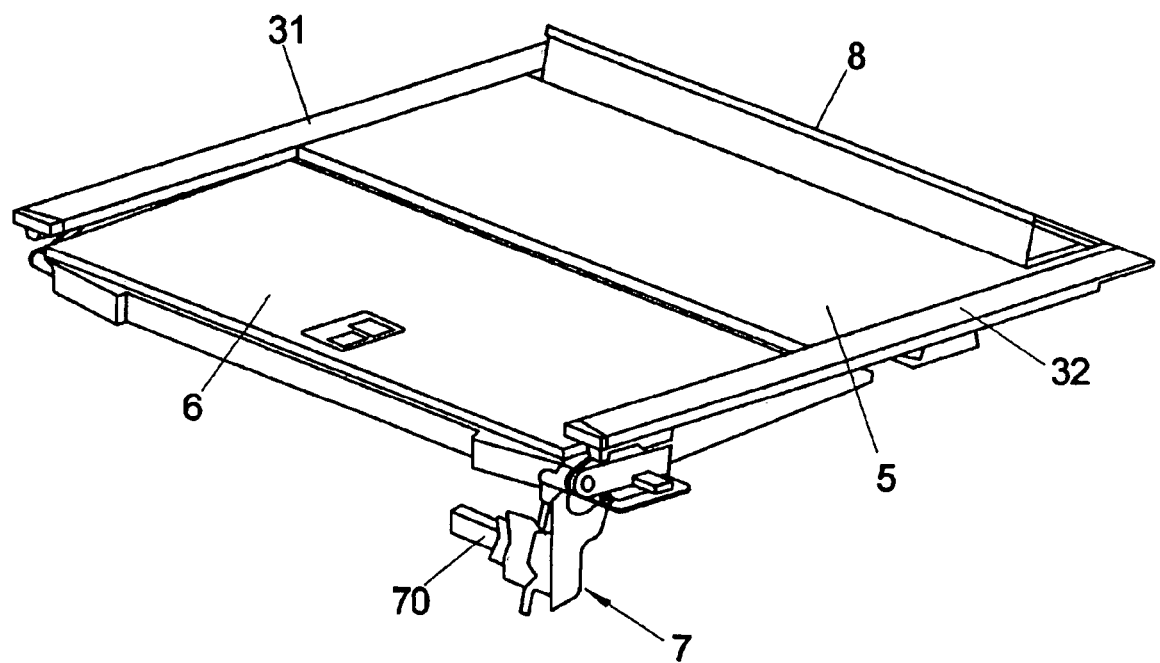
FIG. 4 shows an isometric view of the divided loading base with the first loading base segment raised by pivoting.
Figure 5:
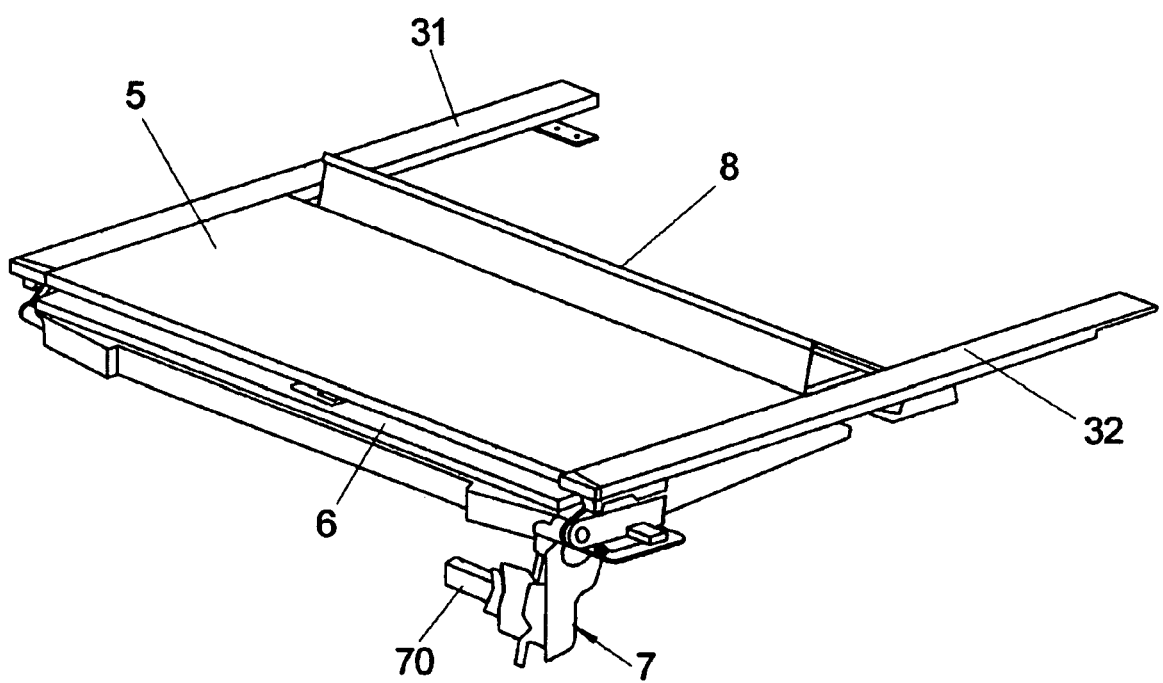
FIG. 5 shows an isometric view of the divided loading base with the first loading base segment adjusted in a translatory manner into the loading and unloading position.

FIG. 4 shows in isometric view the rail system 3 raised from the base position or transport position with the first loading base segment by means of the lifting device 7, and pivoted about the rotational axis 4, from which the first loading base segment 5 may be adjusted in the longitudinal direction along the guide rails 31, 32 into the loading and unloading position shown in FIG. 5 in isometric view.

In the loading and unloading position of the first loading base segment 5, the rear edge 52 of the first loading base segment 5 may project over the upper edge of the loading edge 13, or adjoin the loading edge 13. In this position, a protective mat 9 connected to the rear edge 52 of the first loading base segment 5, according to FIG. 6, may be pulled out by a pull tab 90 and may be placed over the rear 11 of the motor vehicle adjacent to the load space 10, so that a person loading and unloading the load space 10 is protected from soiling as a result of the rear region of the motor vehicle, in particular as a result of a fender arranged in the rear region.

Both the height adjustment and the longitudinal adjustment of the rail system 3 may take place hydraulically, pneumatically or electromotively, and be carried out via an operating switch arranged in the rear region of the load space 10 or by means of a remote control. The embodiments shown in FIGS. 7 to 9 for an adjusting device for the height adjustment and longitudinal adjustment of the first loading base segment 5 make use of an electromotive drive device as is used for a longitudinal seat adjustment device and seat height adjustment device of a motor vehicle.

For the longitudinal adjustment of the first loading base segment 5, the rail system 3 comprises a drive motor 30 arranged centrally between the guide rails 31, 32 which is connected via a preferably flexible shaft 34 to corner gears 35 arranged below the guide rails 31, 32, according to FIG. 9. The drive motor 30 and the drive shafts 34 leading from the drive motor 30 to the corner gears 35, are covered by a cross member 16 according to FIG. 8.

The corner gears 35 are, according to FIG. 9, connected to spindles 36 arranged on the guide rails 31, 32, which mesh with spindle nuts 37, which are connected to the first loading base segment 5. The two spindles 36 are connected to swivel levers 74 of the lifting device 7 via a spindle fastening 75.

According to FIGS. 7, 7A, 7B and 7C the spindles 36 are located in the C-shaped guide rails 31, 32 which are open to the inside, in which slides 17 with rollers 18 are arranged, which are connected to the side edges of the first loading base segment 5. On the guide rails 31, 32 arranged on both sides of the loading base 5, securing eyes 33 are arranged for fastening and/or passing through securing ropes.

Figure 7:
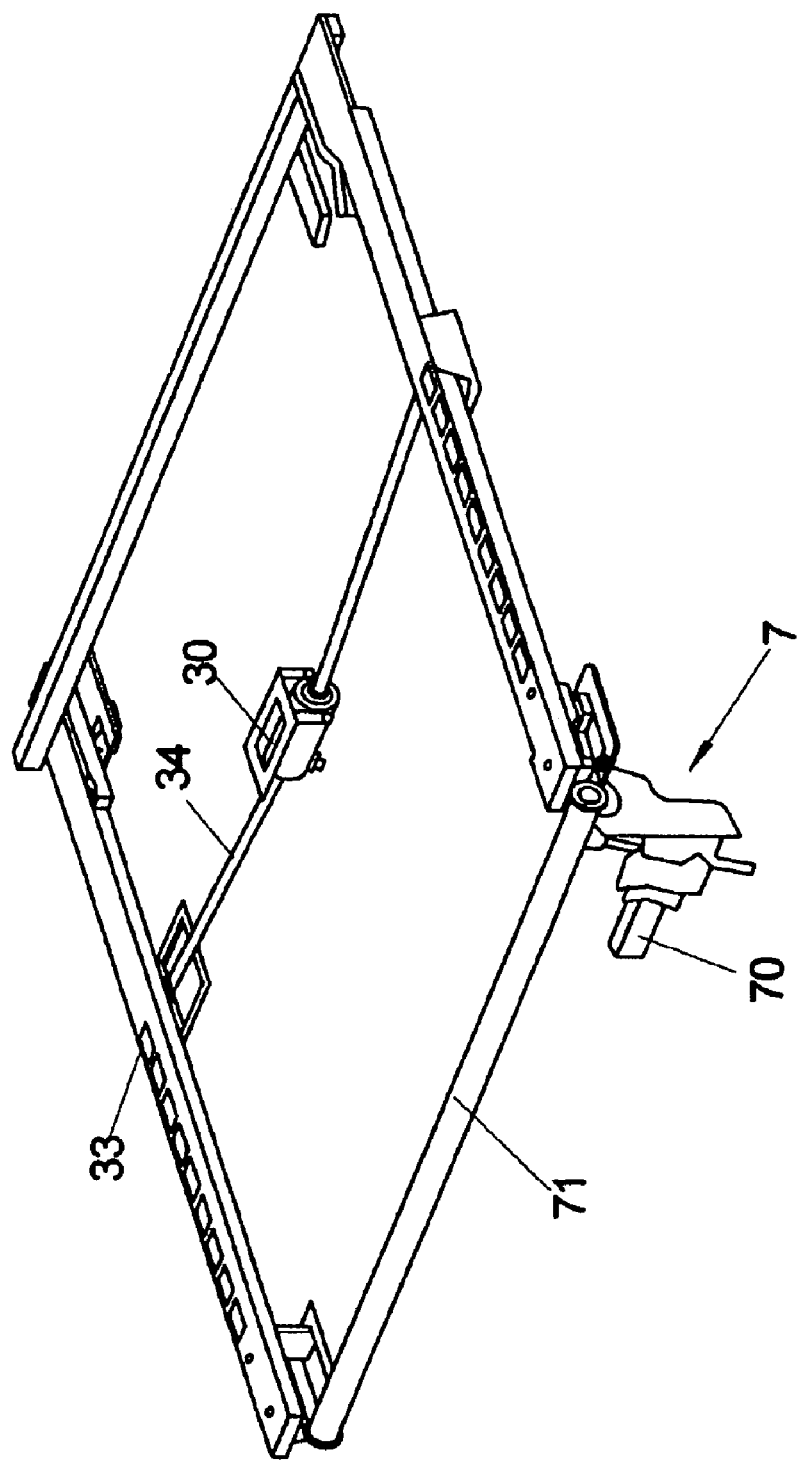
FIG. 7 shows an isometric view of the adjusting device for the height adjustment and longitudinal adjustment of the first loading base segment.
Figure 7A:
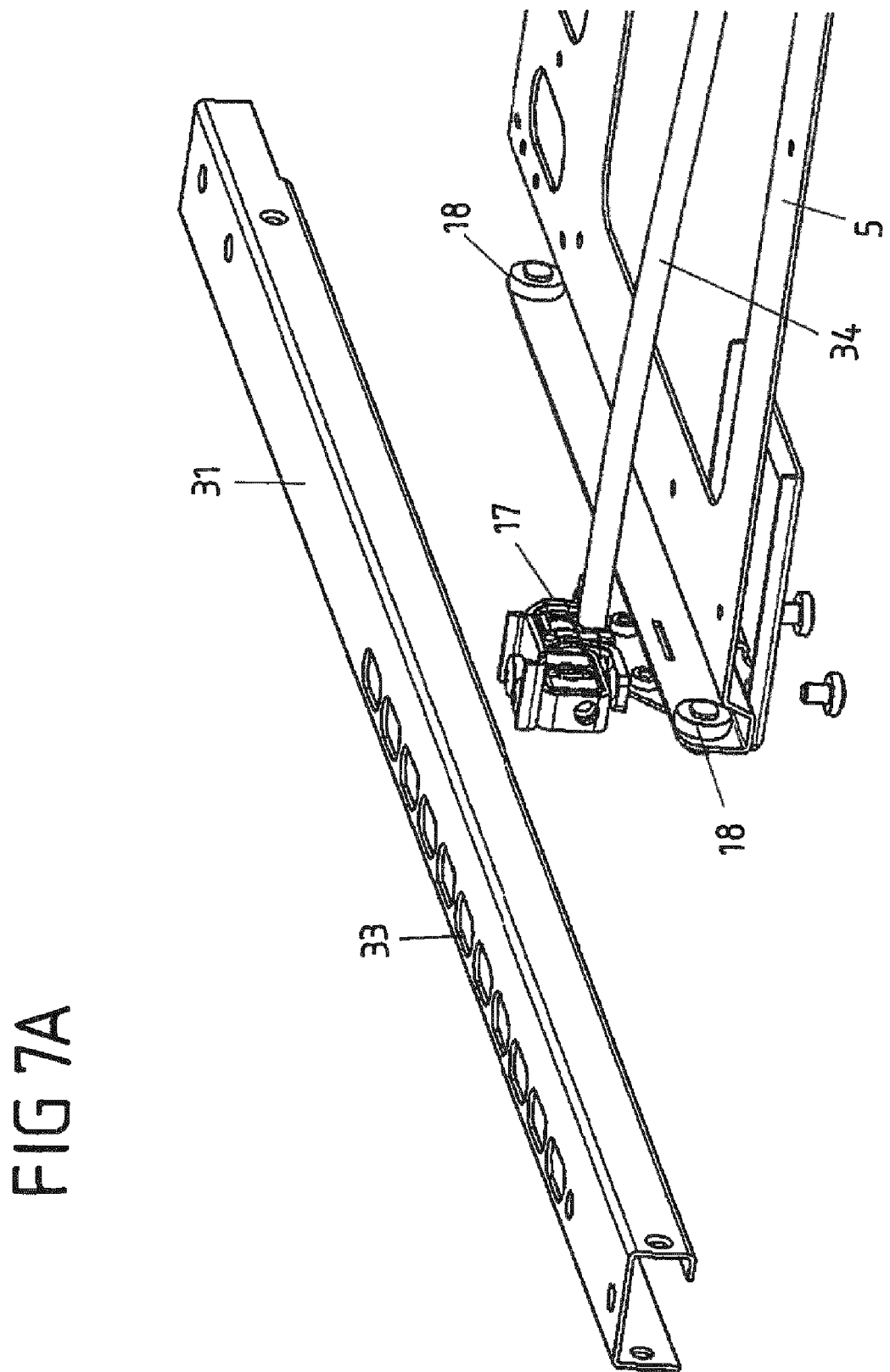
FIG. 7A shows an exploded view of a guide rail and the first loading base segment the side edges of which are connected to a slide and rollers.
Figure 7B:
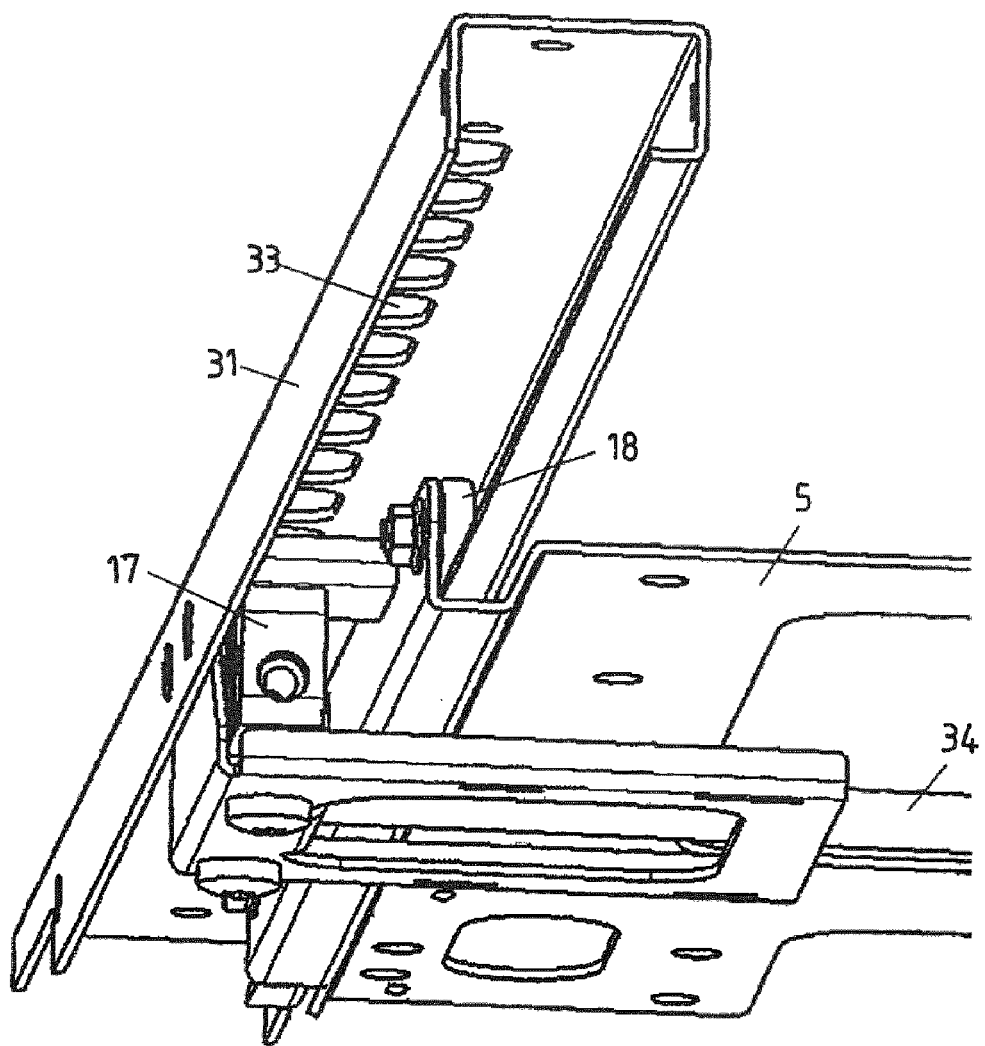
FIG. 7B shows an isometric view of a guide rail and the first loading base segment the side edges of which are connected to the slide and rollers which are arranged in the C-shaped guide rail.

The lifting device 7 configured according to a seat height adjustment device for vehicle seats, according to FIGS. 7 to 9, contains a drive motor with gears 70, which comprises a spindle nut which meshes with a spindle 72. The spindle 72 is articulated on a flange 73 fixedly connected to a shaft 71. The shaft 71 is also fixedly connected to a lever 74, which is articulated on the spindle receiver 75 for the spindles 36 of the longitudinal adjustment device.

During actuation of the drive motor 70 in one or the other rotational direction, the spindle 72 connected to the gears of the drive motor 70 is raised or lowered and accordingly the shaft 71 pivoted via the flange 73 in one or the other direction, so that the lever 74 is lowered toward the plane of the floor of the bodywork or pivoted into a maximum vertical position.

The control of the longitudinal adjustment and height adjustment takes place via a control device which is connected on the output side to the drive motor 30 of the rail system 3 for the longitudinal adjustment and to the drive motor 70 of the lifting device 7 for the height adjustment. The control device on the operator side is able to be actuated by a switch arranged, for example, on the side panel of the load space 10 and/or via a remote control.

As a result of a collision protection control known from the control of a longitudinal seat adjustment device and seat height adjustment device for vehicle seats, body parts or objects may be prevented from being trapped and/or a malfunction avoided.

The control of the height adjustment and longitudinal adjustment may be carried out independently or linked to one another, when lifting the rail system over a height corresponding to the thickness of the second loading base segment, a longitudinal adjustment of the first loading base segment 5 being initiated, in a preferred embodiment, so that the adjustment time for adjusting the first loading base segment 5 is minimized.

By a corresponding operation of the control element on the operator side, different end conditions may be set when moving the first loading base segment 5, for example moving the first loading base segment 5 as far as the loading edge 13 by lifting the rail system 3 and thus the first loading base segment 5 to a height aligned with the upper face of the loading edge 13, or thereunder or alternatively beyond the loading edge 13 in combination with a displacement of the first loading base segment 5 beyond the loading edge 13.

LIST OF REFERENCE NUMERALS

1 Motor vehicle bodywork
2 Back or rear seat
3 Rail system
4 Pivot axis
5 First loading base segment
6 Second loading base segment
7 Lifting device
8 Foldable load limit stop
9 Protective mat
10 Load space
11 Rear
12 Recess
13 Loading edge
14 Floor of the load space on the bodywork side
15 Load space door or tailgate
16 Cross member 21 Seat lower frame
22 Backrest
30 Drive motor
31, 32 Guide rails
33 Securing eyes
34 Drive shafts
35 Corner gears
36 Spindles
37 Spindle nuts
51 Front edge of the first loading base segment
52 Rear edge of the first loading base segment
61 Front edge of the second loading base segment
62 Rear edge of the second loading base segment
70 Drive motor with gears
71 Shaft
72 Spindle
73 Flange
74 Lever
75 Spindle receiver
Pull tab
L Loads
T Dividing line

The invention claimed is:

1. A loading base for motor vehicles comprising:
a first loading base segment behind a seat of the motor vehicle and a second loading base segment arranged behind the first loading base segment in the direction of the vehicle longitudinal axis or X-axis and located to the rear thereof in the direction of travel,
said first loading base segment being configured to be raised and adjusted over said second loading base segment,
said first loading base segment being longitudinally adjustable with a rail system in the direction of the vehicle longitudinal axis or X-axis,
said rail system having guide rails, each guide rail having one end which is pivotable about a pivot axis aligned in the direction of a vehicle transverse axis or Y-axis and arranged in a region adjacent to the seat and the other end thereof being height adjustable with a lifting device arranged in a region of a loading edge,
said rail system having adjusting elements guided in the guide rails and connected to the first loading base segment,
said rail system having a drive device selected from the group consisting of drive devices consisting of electrical, hydraulic, and pneumatic drive device, wherein the drive device is connected to a spindle adjusting device to drive spindles connected to the guide rails, wherein spindle nuts connected to the first loading base segment are arranged on the guide rails.

2. The loading base of claim 1, wherein the rail system is configured in the manner of a longitudinal seat adjustment device of a motor vehicle seat.

3. The loading base of claim 1, wherein the guide rails are aligned parallel to side edges of the first loading base segment.

4. The loading base of claim 1, wherein the adjusting elements comprise slides with rollers guided in the guide rails.

5. The loading base of claim 1, wherein the guide rails comprise a C-profile with slots oriented toward side edges of the first loading base segment.

6. The loading base of claim 1, wherein the guide rails comprise securing eyes for at least one of fastening and passing through securing ropes.

7. The loading base of claim 1, wherein the lifting device is configured to be adjusted with a drive device selected from the group consisting of drive devices consisting of electrical, hydraulic, and pneumatic drive.

8. The loading base of claim 7, wherein the drive device of the lifting device is connected to a spindle adjusting device and drives a spindle nut meshing with a spindle articulated to a flange, and wherein the flange fixedly connected to a shaft rotates the shaft in one or the other direction and pivots a lever fixedly connected to the shaft and articulated to a spindle receiver for the spindles of the longitudinal adjustment device.

9. The loading base of claim 1, further comprising a control device for the longitudinal adjustment of the rail system and height adjustment of the lifting device activating a drive motor of the rail system and a drive motor of the lifting device, wherein the control device is connected on an operator side to an operating switch at least one of being arranged in the load space and configured to be actuated by a remote control, and wherein the control device contains a collision protection control for preventing body parts or objects from being trapped.

10. The loading base of claim 1, wherein a dividing line is aligned between the loading base segments in the direction of the vehicle transverse axis or Y-axis.

11. The loading base of claim 1, wherein the first loading base segment is adjacent to the back seats of the motor.

12. The loading base of claim 1, wherein the first loading base segment is configured to be adjusted at least as far as a loading edge defining a loading base to the rear of the motor vehicle.

13. The loading base of claim 1, wherein the first loading base segment is configured to be raised and adjusted over a loading edge defining a loading base to the rear of the motor vehicle.

14. The loading base of claim 1, wherein the second loading base segment is arranged at least on and parallel to a floor on a bodywork side and is foldably connected to the floor on the bodywork side about an axis.

15. The loading base of claim 14, wherein the second loading base segment covers a recess of the floor on the bodywork side.

16. The loading base of claim 1, further comprising a step-shaped load limit stop in the region of a front edge of the first loading base segment adjacent to the back or rear seats.

17. The loading base of claim 16, wherein the load limit stop is configured to be foldably connected to the first loading base segment, such that the load limit stop projects in a first position from a surface of the first loading base segment and is aligned in a second position parallel to a surface plane of the first loading base segment.

* * * * *